(12) United States Patent
Tosa (10) Patent No.: US 10,083,294 B2
(45) Date of Patent: *Sep. 25, 2018

(54) SYSTEMS AND METHODS FOR DETECTING RETURN-ORIENTED PROGRAMMING (ROP) EXPLOITS

(71) Applicant: Bitdefender IPR Management Ltd., Nicosia (CY)

(72) Inventor: Raul V. Tosa, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 18 days.

This patent is subject to a terminal disclaimer.

(21) Appl. No.: 15/289,761

(22) Filed: Oct. 10, 2016

(65) Prior Publication Data
US 2017/0024558 A1    Jan. 26, 2017

Related U.S. Application Data

(63) Continuation of application No. 14/073,368, filed on Nov. 6, 2013, now Pat. No. 9,465,936.

(51) Int. Cl.
*G06F 21/00* (2013.01)
*G06F 21/52* (2013.01)
*G06F 21/55* (2013.01)

(52) U.S. Cl.
CPC ............ *G06F 21/52* (2013.01); *G06F 21/556* (2013.01)

(58) Field of Classification Search
CPC .............................. G06F 21/556; G06F 21/52
See application file for complete search history.

(56) References Cited

U.S. PATENT DOCUMENTS

| 7,287,283 | B1 * | 10/2007 | Szor | G06F 21/52 713/165 |
| 2013/0276127 | A1 * | 10/2013 | Seshappa | G06F 21/52 726/26 |
| 2014/0344932 | A1 * | 11/2014 | Polychronakis | G06F 21/562 726/23 |
| 2015/0339480 | A1 * | 11/2015 | Lutas | G06F 21/56 726/22 |

* cited by examiner

*Primary Examiner* — John B King
(74) *Attorney, Agent, or Firm* — Law Office of Andrei D Popovici, PC (57) ABSTRACT

Described systems and methods allow protecting a computer system from malware, such as return-oriented programming (ROP) exploits. In some embodiments, a set of references are identified within a call stack used by a thread of a target process, each reference pointing into the memory space of an executable module loaded by the target process. Each such reference is analyzed to determine whether it points to a ROP gadget, and whether the respective reference was pushed on the stack by a legitimate function call. In some embodiments, a ROP score is indicative of whether the target process is subject to a ROP attack, the score determined according to a count of references to a loaded module, according to a stack footprint of the respective module, and further according to a count of ROP gadgets identified within the respective module.

19 Claims, 9 Drawing Sheets

SYSTEMS AND METHODS FOR DETECTING RETURN-ORIENTED PROGRAMMING (ROP) EXPLOITS

CROSS REFERENCE TO RELATED APPLICATION(S)

This application is a continuation of U.S. patent application Ser. No. 14/073,368, filed Nov. 6, 2013, entitled "Systems and methods for detecting return-oriented programming (ROP) exploits," which is scheduled to issue on Oct. 11, 2016 as U.S. Pat. No. 9,465,936, and which is hereby incorporated by reference in its entirety.

BACKGROUND

The invention relates to systems and methods for protecting computer systems from malware.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

A particular kind of malware consists of a return-oriented programming (ROP) exploit, also known in the art as a return-into-library attack, or a code reuse attack. A typical ROP exploit includes an illegitimate manipulation of a call stack used by a thread of a process, the illegitimate manipulation intended to alter the original functionality of the respective process. For instance, an exemplary ROP exploit may manipulate the call stack so as to force the host system to execute only a subset of instructions of the original process, and/or to execute such instructions in a sequence, which differs from the sequence of instructions of the original process.

By re-using pieces of code from legitimate processes to carry out malicious activities, ROP exploits may evade detection by conventional anti-malware techniques. Therefore, there is a strong interest in developing systems and methods capable of effectively targeting ROP malware, with minimal computational costs.

SUMMARY

According to one aspect, a host system comprises at least one hardware processor configured to identify a target area of a call stack of a target process executing on the host system. The at least one hardware processor is further configured to identify a set of gadget references within the target area, each identified gadget reference pointing to a section of memory hosting a return-oriented programming (ROP) gadget. The at least one hardware processor is further configured, in response to identifying the target area and the set of gadget references, to determine whether the target process is malicious according to a proportion of the target area occupied by the set of gadget references.

According to another aspect, a method comprises employing at least one hardware processor of a host system to identify a target area of a call stack of a target process executing on the host system. The method further comprises employing the at least one hardware processor to identify a set of gadget references within the target area, each identified gadget reference pointing to a section of memory hosting a return-oriented programming (ROP) gadget. The method further comprises, in response to identifying the target area and the set of gadget references, employing the at least one hardware processor to determine whether the target process is malicious according to a proportion of the target area occupied by the set of gadget references.

According to another aspect, a non-transitory computer-readable medium stores instructions which, when executed by at least one hardware processor of a host system, cause the host system to identify a target area of a call stack of a target process executing on the host system. The instructions further cause the host system to identify a set of gadget references within the target area, each identified gadget reference pointing to a section of memory hosting a return-oriented programming (ROP) gadget. The instructions further cause the host system, in response to identifying the target area and the set of gadget references, to determine whether the target process is malicious according to a proportion of the target area occupied by the set of gadget references.

BRIEF DESCRIPTION OF THE DRAWINGS

The foregoing aspects and advantages of the present invention will become better understood upon reading the following detailed description and upon reference to the drawings where:

FIG. 9-A illustrates an exemplary stack of a clean thread (not subject to a ROP exploit), according to some embodiments of the present invention.

FIG. 9-B illustrates an exemplary stack of a thread subject to an ROP exploit, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a process is an instance of a computer program, such as an application or a part of an operating system, and is characterized by having at least an execution thread and a section of virtual memory assigned to it by the operating system, the respective section comprising executable code. Unless otherwise specified, a page represents the smallest unit of virtual memory individually mapped to a physical memory of a host computer system. A process is said to be subject to a ROP exploit when a call stack of a thread of the respective process is being used to carry out the respective ROP exploit. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter al/a, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
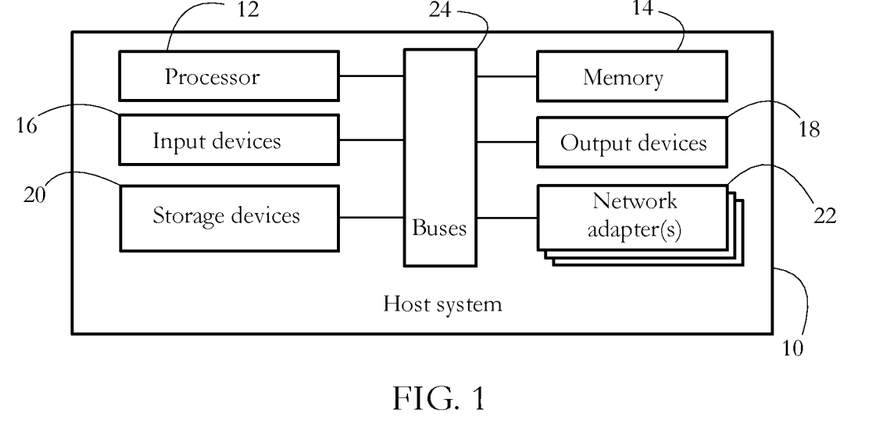
FIG. 1 shows an exemplary hardware configuration of a host computer system protected from malware according to some embodiments of the present invention.

FIG. 1 shows an exemplary hardware configuration of a host system 10 performing anti-malware operations according to some embodiments of the present invention. Host system 10 may represent a corporate computing device such as an enterprise server, or an end-user device such as a personal computer or a smartphone, among others. Other host systems include entertainment devices such as TVs and game consoles, or any other device having a memory and a processor, and requiring malware protection. Host system 10 comprises a set of physical devices, including a processor 12, a memory unit 14, a set of input devices 16, a set of output devices 18, a set of storage devices 20, and a set of network adapters 22, all connected by a set of buses 24. In some embodiments, processor 12 comprises a physical device (e.g. multi-core integrated circuit) configured to execute computational and/or logical operations with a set of signals and/or data. In some embodiments, such logical operations are delivered to processor 12 in the form of a sequence of processor instructions (e.g. machine code or other type of software).

Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into host system 10. Output devices 18 may include display devices such as monitors and speakers among others, as well as hardware interfaces/adapters such as graphic cards, allowing host system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of software instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Buses 24 collectively represent the plurality of system, peripheral, and chipset buses, and/or all other circuitry enabling the intercommunication of devices 12-22 of host system 10. For example, buses 24 may comprise the northbridge connecting processor 12 to memory 14, and/or the southbridge connecting processor 12 to devices 16-22, among others.

Figure 2:
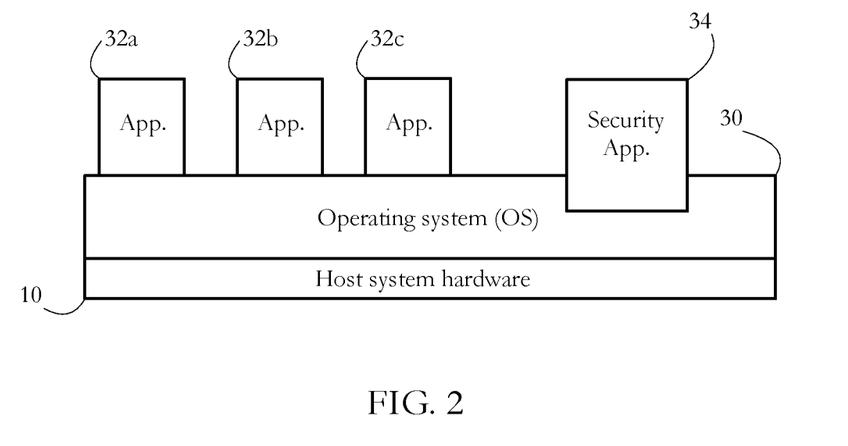
FIG. 2 shows an exemplary set of applications, including a security application executing on the host system of FIG. 1 according to some embodiments of the present invention.

FIG. 2 shows an exemplary set of software objects executing on host system 10 according to some embodiments of the present invention. An operating system (OS) 30 comprises software that provides an interface to the hardware of host system 10, and acts as a host for a set of software applications 32a-c and a security application 34. OS 30 may comprise any widely available operating system such as Windows®, MacOS®, Linux®, iOS®, or Android™, among others. Applications 32a-c may include word processing, image processing, database, browser, and electronic communication applications, among others. Security application 34 may be configured to protect host system 10 from malware, and in particular from return-oriented programming (ROP) exploits, as described further below. In some embodiments, an ROP exploit includes an illegitimate manipulation of a call stack used by a process executing on host system 10, the illegitimate manipulation intended to alter the original functionality of the respective process. For instance, an exemplary ROP exploit may manipulate the call stack so as to execute only a subset of instructions of the original process, or to execute such instructions in a sequence, which differs from the sequence of instructions of the original process. Such manipulations are typically done with malicious intent. Security application 34 may be a standalone program, or may form part of a software suite comprising, among others, anti-malware, anti-spam, and anti-spyware components.

In some embodiments supporting hardware virtualization, OS 30, applications 32a-c, and security application 34 may run within a virtual machine exposed by a hypervisor executing on host system 10. Virtual machines (VM) are commonly known in the art as software emulations of actual physical machines/computer systems, each capable of running its own operating system and software independently of other VMs. A typical hypervisor comprises software allowing the multiplexing (sharing) by multiple virtual machines of hardware resources of the host system. Examples of popular hypervisors include the VMware vSphere™ from VMware, Inc., and the open-source Xen hypervisor, among others.

Figure 3:
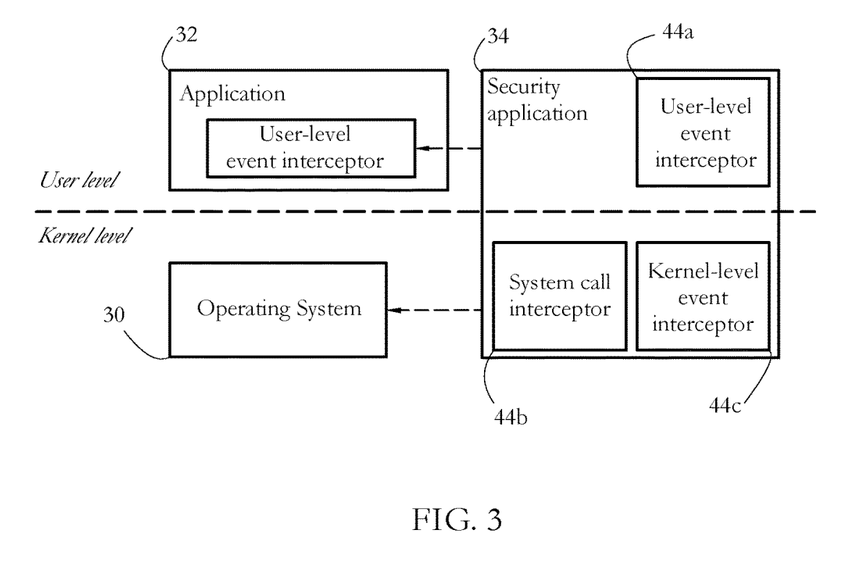
FIG. 3 illustrates an exemplary hierarchy of software objects executing on the host system in the configuration of FIG. 2, according to some embodiments of the present invention.

FIG. 3 illustrates a hierarchy of software objects executing on host system 10 according to some embodiments of the present invention. FIG. 3 is represented from the perspective of processor privilege levels, also known in the art as layers or protection rings. In some embodiments, each such layer or protection ring is characterized by a set of instructions, which a software object executing at the respective processor privilege level is allowed to execute. When a software object attempts to execute an instruction, which is not allowed within the respective privilege level, the attempt may trigger a processor event, such as an exception, a fault, or a virtual machine exit event. In some embodiments, switching between privilege levels may be achieved via a set of dedicated instructions. Such exemplary instructions include SYSCALL/SYSENTER, which switch from user level to kernel level, SYSRET/SYSEXIT, which switch from kernel level to user level.

Most components of OS 30 execute at kernel level of processor privilege. An exemplary application 32 executes at lesser processor privilege than OS 30 (e.g., ring 3, or user mode). In some embodiments, parts of security application 34 may execute at user-level processor privilege, i.e., same level as application 32. For instance, such parts may comprise a graphical user interface informing a user of any malware or security threats detected on the respective VM, and receiving input from the user indicating, e.g., a desired configuration option for application 34. Another exemplary part of application 34 executing at user level includes a user-level event-interceptor 44a configured as shown below. In some embodiments, user-level event interceptor 44a may comprise a hooking module installed by application 34 within an evaluated application, such as application 32.

Other parts of application 34 may execute at kernel privilege level. For instance, application 34 may install a kernel-level event interceptor 44b and/or a system call interceptor 44c operating at kernel level. Interceptors 44b-c may be part of an anti-malware (AM) driver providing functionality to anti-malware application 34, e.g. to scan memory for malware signatures and/or to detect malware-indicative behavior of processes and/or other software objects executing on OS 30.

Figure 4:
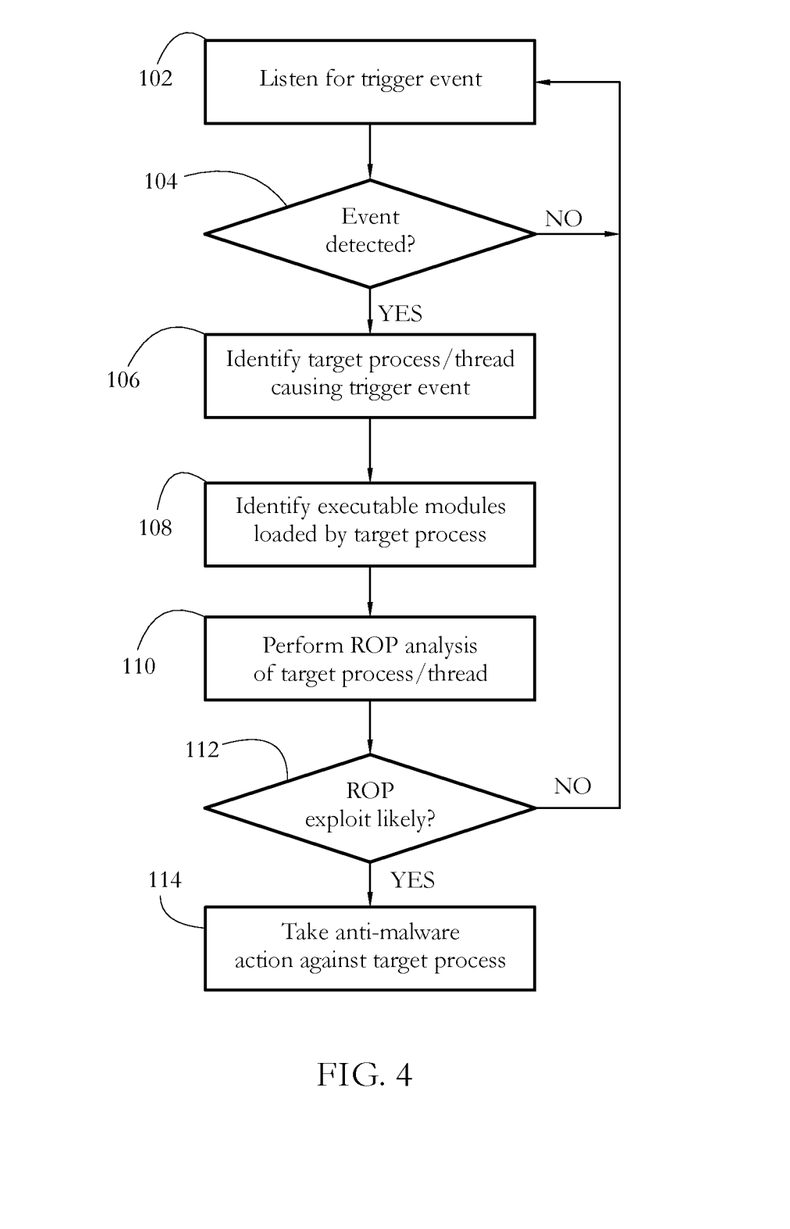
FIG. 4 shows an exemplary sequence of steps executed by the security application to detect a ROP exploit, according to some embodiments of the present invention.

FIG. 4 shows an exemplary sequence of steps performed by security application 34 to detect a ROP exploit according to some embodiments of the present invention implemented in a Windows® environment. In a sequence of steps 102-104, application 34 waits for the occurrence of a trigger event. Exemplary trigger events include a target process calling a particular function of OS 30, the respective function performing an operation that can be used in an ROP exploit. For instance, such functions may perform memory allocation, or may set/change execution rights to a section of allocated memory. In a Windows® environment, some such exemplary trigger events include calls to VirtualAlloc( ) VirtualProtect( ) HeapCreate( ) and HeapAlloc( ) API functions, among others.

Figure 5:
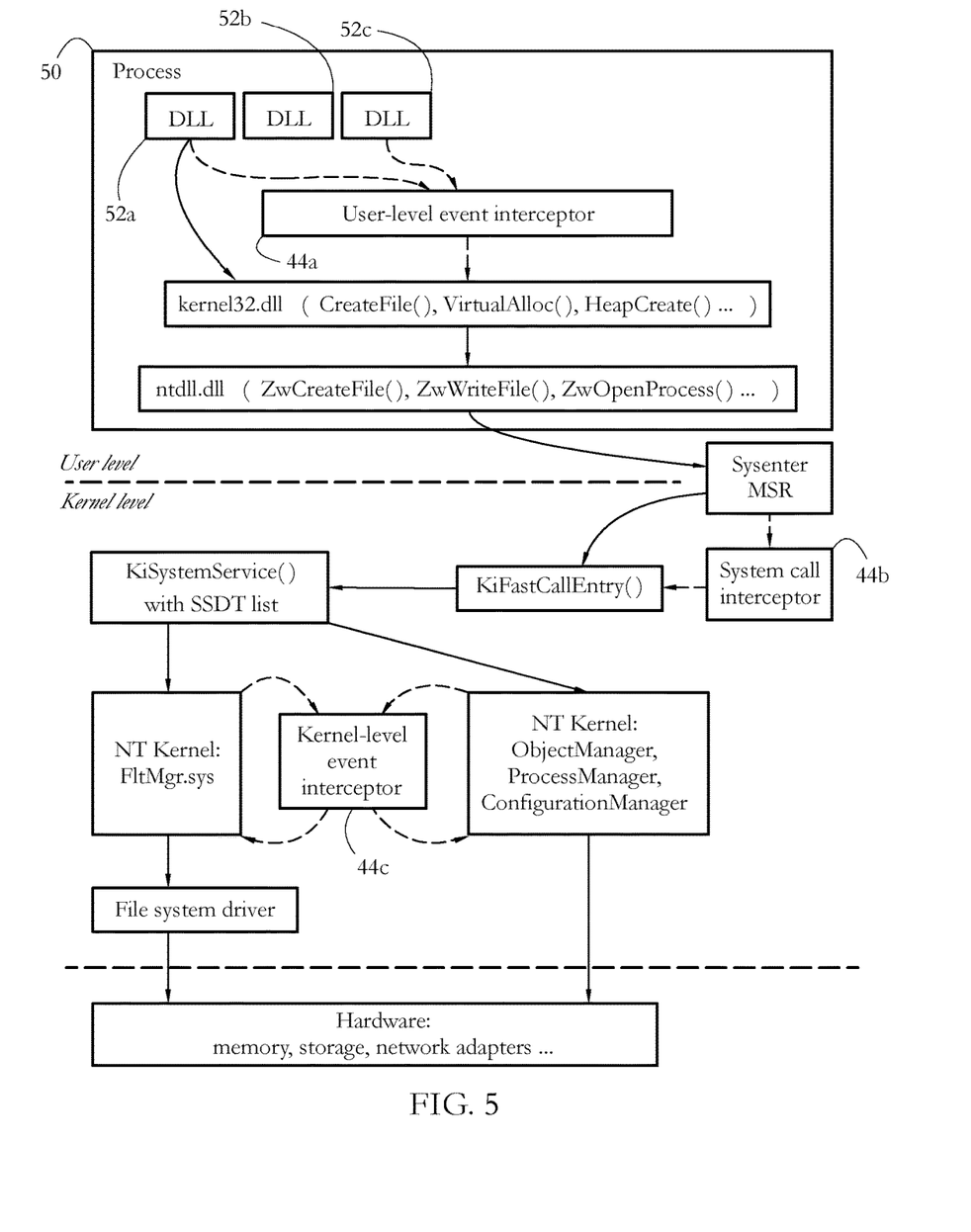
FIG. 5 illustrates an exemplary execution flow of a process in a Windows® environment. Solid arrows indicate an exemplary execution flow in the absence of an anti-malware system. Dashed arrows indicate modifications to the execution flow, the modifications introduced by event interceptors operating according to some embodiments of the present invention.

To illustrate the operation of event interceptors 44a-c, FIG. 5 shows an exemplary execution flow of a process 50 according to some embodiments of the present invention. For simplicity, the flow is shown for an instance of a Windows® OS; similar diagrams may be rendered for other operating systems such as Linux, for instance. Solid arrows represent the execution flow in the absence of event interceptor code (e.g., in the absence of anti-malware software). Dashed arrows represent modifications to the flow due to the presence of event interceptors 44a-c executing according to some embodiments of the present invention.

Process 50 loads a plurality of executable modules 52a-c, in this case, dynamic-linked libraries (DLLs). When process 50 executes an instruction calling for some system functionality, e.g. to allocate a section of memory, or to write something to a disk file, the respective instruction calls a user-mode API such as kernel32.dll or ntdll.dll. In the example of FIG. 5, the respective user-mode API call is intercepted and analyzed by user-level event interceptor 44a. Such interceptions may be achieved by any method known in the art, such as hooking. Hooking is a generic term used in the art for a method of intercepting function calls, or messages, or events passed between software components. One exemplary hooking method comprises altering the entry point of a target function, by inserting an instruction redirecting execution to a second function. Following such hooking, the second function may be executed instead, before, or after the target function. In the example of FIG. 5, application 34 may install hooks into certain functions of kernel32.dll or ntdll.dll, to instruct the respective functions to redirect execution to event interceptor 44a. Thus, interceptor 44a may detect that process 50 is attempting to perform a certain action, identified according to the hooked function.

In a typical flow of execution, the user-mode API function called by process 50 may request service from the operating system's kernel. In some embodiments, such operations are carried out by issuing a system call, such as SYSCALL and SYSENTER on x86 platforms. In the example of FIG. 5, such system calls are intercepted by system call interceptor 44b. In some embodiments, such interception comprises, for instance, modifying a system call handler routine by changing a value stored in a model-specific register (MSR) of processor 12, which effectively redirects execution to interceptor 44b. Such techniques are known in the art as MSR hooking, and may allow interceptor 44b to detect that the evaluated process is attempting to perform certain system calls, such as NtAllocateVirtualMemory( ) and NtProtectVirtualMemory( ) among others.

Following the system call, control of the processor is typically turned over to the kernel of OS 30. In some embodiments, kernel-level interceptor 44c is configured to intercept certain operations of the OS kernel, and therefore determine that the evaluated process is attempting to perform certain operations, which may be indicative of an ROP exploit. To intercept such operations, some embodiments may employ a set of filtering mechanisms built into and exposed by OS 30. For example, in a Windows OS, FltRegisterFilter may be used to intercept operations like creating, opening, writing to, and deleting a file. In another example, kernel-level event interceptor 44c may use ObRegisterCallback to intercept create or duplicate object-handle operations, or PsSetCreateProcessNotifyRoutine to intercept the creation of new processes. In yet another example, Windows registry operations such as creating and setting registry keys/values may be intercepted using CmRegisterCallbackEx. Similar filtering mechanisms are known in the art for other operating systems such as Linux®.

Performing the interception of a trigger event (steps 102-104 in FIG. 4) from user-level of processor privilege, for instance using user-level interceptor 44a as described above, may result in contaminating the call stack with items pushed on the stack by the hook functions performing the actual interception. To avoid unwanted modifications to the call stack, some embodiments may prefer intercepting trigger events at kernel level and/or system call level, over intercepting at user level. Alternatively, in some embodiments, the analysis of the target thread/process (see below) may be performed by a second thread distinct from the target thread, the second thread executing concurrently with the target thread. For instance, the second thread may be synchronized with the target thread for the duration of the analysis, so that the target thread is not contaminated by software components performing the interception and/or the actual analysis.

When a trigger event has occurred, a step 106 (FIG. 4) identifies a target process and/or target thread causing the trigger event. In some embodiments, interception of the trigger event is performed from within the context of the process currently in execution; in such cases the target process and/or target thread are identified as the process/thread currently in execution. In a step 108, security application 34 may identify a set of executable modules loaded by the target process. Unless otherwise specified, an executable module is a component or a building block of a process; each such module comprises executable code. Exemplary executable modules include a main executable of a process (such as an EXE file in Windows®), and a shared library (such as a dynamic-linked library—DLL), among others. In some embodiments, the main executable module of a process comprises the first processor instruction of the process, executed when the respective process is launched. Libraries are self-contained sections of code implementing various functional aspects of a program. Shared libraries may be used independently by more than one program. Similar kinds of executable modules may be identified in host systems 10 executing operating systems such as Linux®, or MacOS®. Executable modules may be loaded and/or unloaded to/from memory during the launch and/or execution of the respective process.

In some embodiments, step 108 further includes determining a virtual and/or physical memory address (also termed base address) of each loaded module. Such memory addresses may point to a section of memory holding executable code and/or data of the respective module. Determining such memory addresses may comprise any method known in the art, such as parsing data structures employed by OS 30 to represent currently executing processes and/or threads (e.g EPROCESS data structures in a Windows environment).

Figure 6:
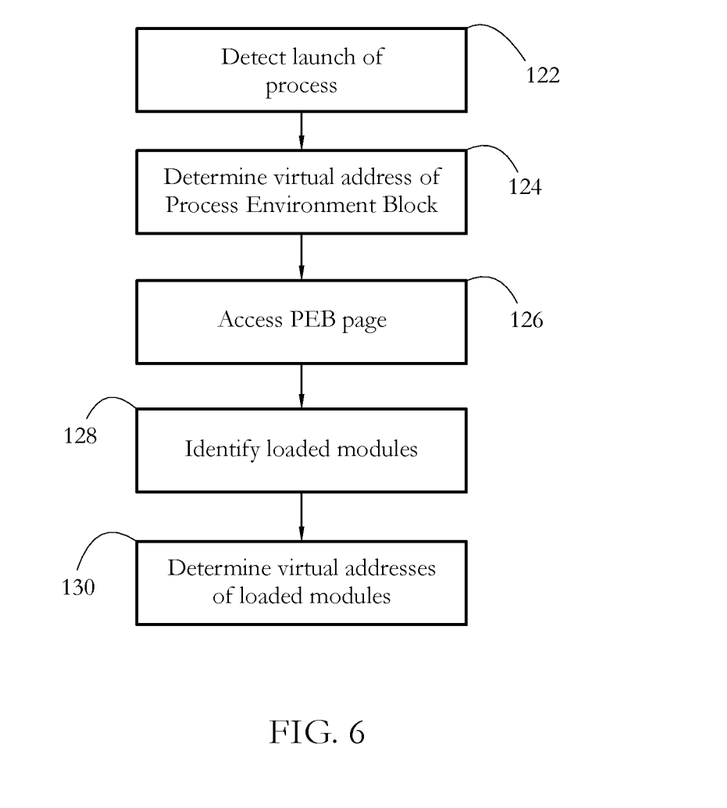
FIG. 6 illustrates a sequence of steps performed by the security application to assemble a list of active processes and/or a list of addresses of loaded modules according to some embodiments of the present invention.

In an alternative to step 108, security application 34 may maintain a data structure comprising entries corresponding to currently executing processes, e.g., by adding entries when new processes are launched and removing the respective entires upon termination of the respective processes. Such a data structure may further include a record of all executable modules loaded by each process, either at launch, or during execution. Records of executable modules may include virtual and/or physical addresses of the respective executable modules. FIG. 6 shows an exemplary sequence of steps performed by application 34 to add a process to such a data structure of active processes, according to some embodiments of the present invention. Some steps illustrated in FIG. 6 may be performed by event interceptors 44*b-c* operating in kernel mode.

Next, a step 110 performs an ROP analysis of the target thread, as shown in detail below in relation to FIG. 7. A step 112 determines whether the analysis performed in step 110 indicates that a ROP exploit is likely, and when no, application 34 returns to step 102 described above. When a ROP exploit is likely, in a step 114, security application 34 may take anti-malware action against the target process. Exemplary anti-malware actions include stopping or restricting the execution of the target process, quarantining the target process, and notifying a user of host system 10, among others.

Figure 7:
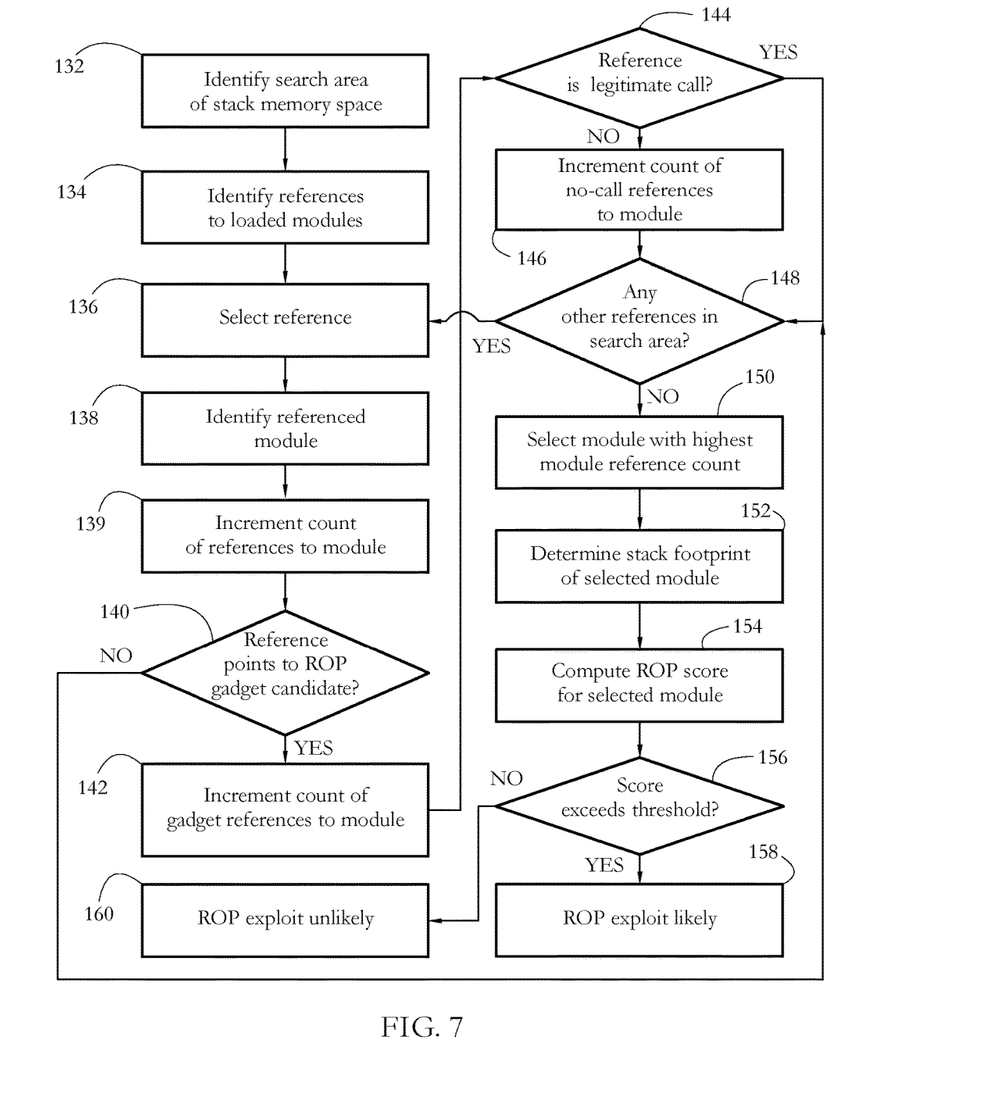
FIG. 7 shows an exemplary sequence of steps performed by the security application to determine whether a target process is subject to a ROP exploit, according to some embodiments of the present invention.

FIG. 7 shows an exemplary sequence of steps performed by security application 34 to determine whether the target process is subject to a ROP exploit according to some embodiments of the present invention. A step 132 identifies a search area of the call stack of the target thread. In some embodiments, the search area includes a region of stack memory space located above the stack pointer, as well as a region of stack memory space situated below the stack pointer. In an exemplary embodiment implemented on an x86 platform, the stack pointer may comprise a value stored in the ESP or RSP registers of processor 12. Herein, the region above the stack to pointer is meant to indicate a section of virtual memory comprising addresses preceding the address indicated by the stack pointer (i.e., between the stack pointer and the stack limit), whereas the region below the stack pointer comprises virtual addresses following the address indicated by the stack pointer (i.e., between the stack pointer and the bottom of the stack). In one such embodiment, the search area may consist of a region of memory of a predetermined size (e.g., 256 bytes, or 64 stack items), centered around the address indicated by the stack pointer. In some embodiments, a stack item represents a content stored within the smallest unit of stack memory, the unit capable of storing a memory address. For instance, on 32 bit platforms, each stack item occupies 4 bytes of stack memory space. An exemplary illustration of the search area is given in FIG. 8.

A step 134 parses the search area of the stack to identify a set of module references, each module reference pointing to an executable module loaded by the target process. In some embodiments, a reference is a stack item comprising a memory address. A reference is said to point to a module when the respective reference comprises a memory address located within a section of memory allocated to the respective module. Exemplary module references within call stack 70 are represented as stack items 62*a-d* in FIG. 8. Each such reference points to one of executable modules 52*a-c*. To determine whether a reference points to a loaded module, application 34 may use data determined in step 108 and/or step 130 (see above). In some embodiments, in step 134, security application also determines whether each module reference is placed above or below the stack pointer. Such information may be useful since the region above the stack pointer may be contaminated with items pushed on the stack as a result of event interception (see above).

Next, security application 34 may perform a set of steps 136-148 in a loop, for each module reference identified in step 134. A sequence 136-138 selects a reference from the search area, and identifies the executable module pointed to by the selected reference. A step 139 increments a counter indicating a count of module references to the respective module. Next, in a step 140, security application 34 determines whether the selected reference is a gadget reference. In some embodiments, a module reference is a gadget reference when the respective module reference points to a ROP gadget within the respective module, i.e., when a section of memory indicated by the reference contains a ROP gadget.

Figure 8:
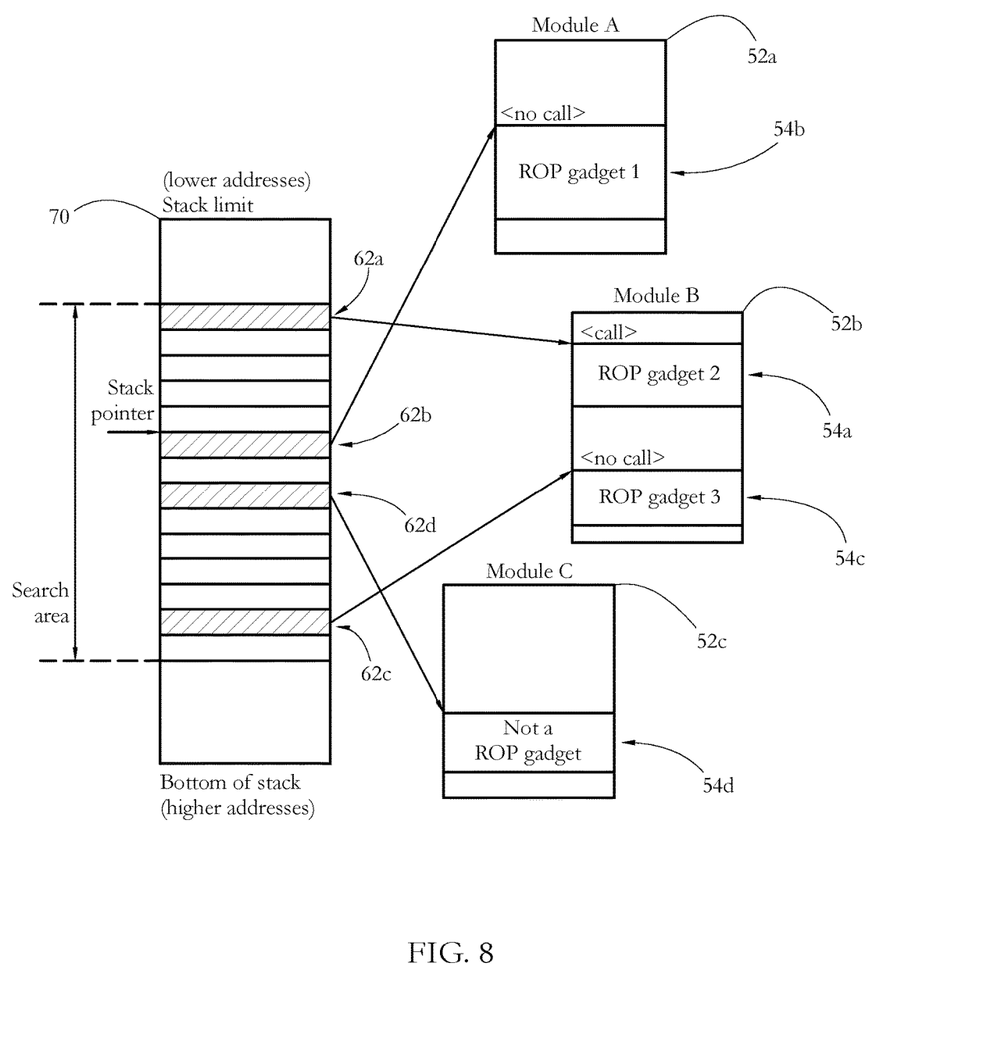
FIG. 8 shows an exemplary stack of a thread executing on the host system, the stack comprising a plurality of references, each pointing to a section of code of a loaded executable module. Some illustrated sections of code may be identified as ROP gadgets, according to some embodiments of the present invention.

A ROP gadget is known in the art as a sequence of processor instructions, which may be used in an ROP exploit, either on its own, or in combination with other ROP gadgets. In some embodiments, an ROP gadget is a relatively short sequence of instructions, for instance between 0 and 3, followed by a return instruction. In some embodiments, a decision whether a sequence of instructions pointed to by the selected reference is a ROP gadget (step 140) is made according to a count of instructions preceding a return instruction, and/or according to a type of instruction found within the respective sequence. For instance, in some embodiments, when the analyzed sequence of instructions contains a CALL instruction, the respective sequence is not considered a ROP gadget. To perform step 140, some embodiments may disassemble a content of a section of memory pointed to by the selected reference, to retrieve a set of processor instructions stored within the respective section of memory. FIG. 8 shows a set of exemplary ROP gadgets 54*a-c*, each pointed to by references 62*a-c*, respectively. FIG. 8 further shows a sequence of code 54*d*, which is not a ROP gadget, sequence 54*d* pointed to by reference 62*d*. When the selected reference does not point to a ROP gadget, application 34 advances to a step 148.

When the selected reference does point to a ROP gadget, in a step 142, security application 34 may increment a counter recording a count of gadget references to the respective module. Next, in a step 144, security application 34 determines whether the selected gadget reference is indicative of a legitimate call, i.e., whether the selected gadget reference is pushed on the stack as part of the original functionality of the target thread/process, as opposed to an exploit. In some embodiments, step 144 comprises inspecting the instruction immediately preceding the respective ROP gadget in the memory space of the respective module, to determine whether the instruction comprises a call resulting in the selected gadget reference being pushed onto the stack. In some embodiments, a call pushing the reference to the ROP gadget onto the stack, the call immediately preceding the ROP gadget, indicates a legitimate call. In the example of FIG. 8, ROP gadget 2 is preceded by a legitimate call, whereas gadgets 1 and 3 are not. When the selected reference is pushed on the stack by a legitimate call, security application 34 proceeds to step 148.

When the selected gadget reference is not pushed on the stack by a legitimate call, the selected gadget reference is labeled as a no-call reference, and step 146 may increment a counter recording a count of no-call references to the respective module. A step 148 checks whether there are any more module references left unanalyzed within the search area of the stack. When yes, application 34 returns to step 136 described above.

Figure 9:
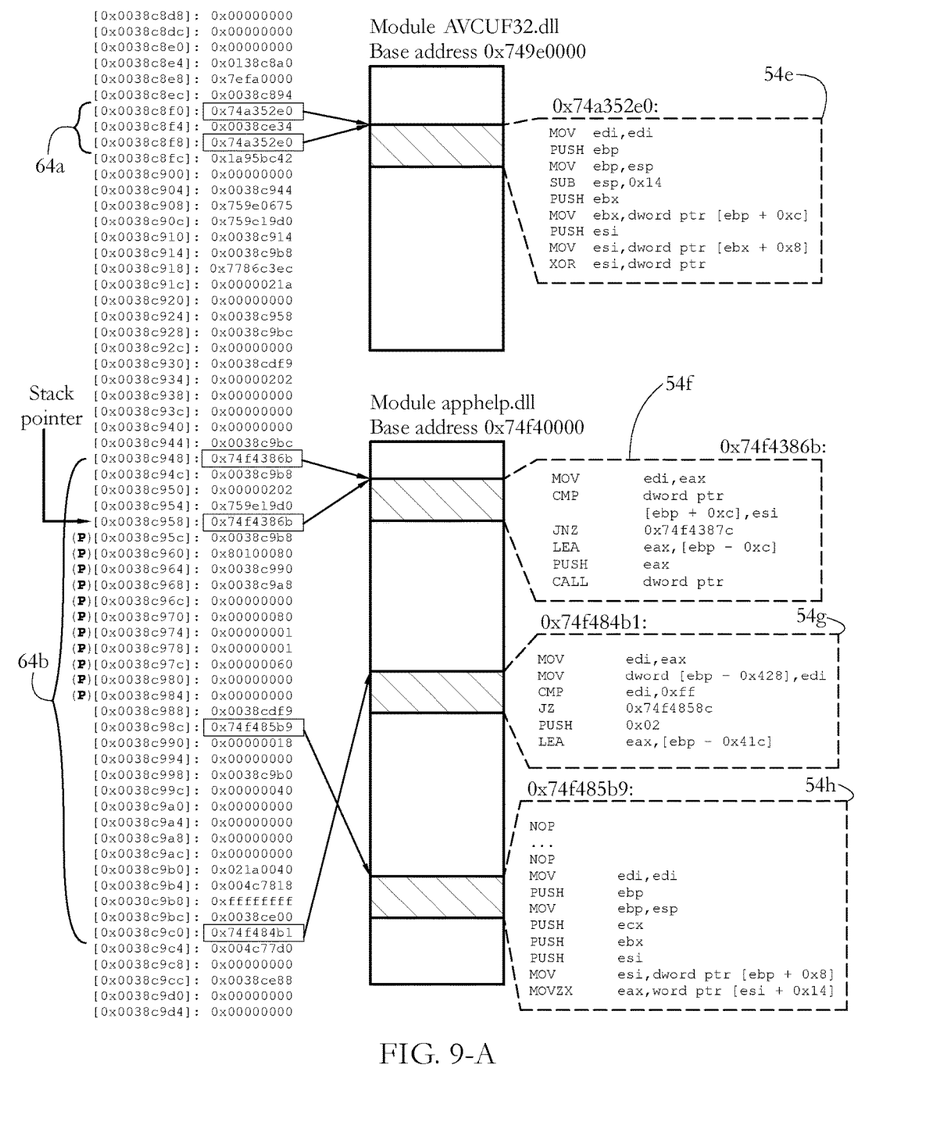

When all module references identified in step 134 were analyzed according to steps 136-148, in a step 150, application 34 may select a module having the highest count of module references pointing to it, using, for instance, the count of references performed in step 139. A step 152 determines a stack footprint of the selected module. In some embodiments, the stack footprint of a module is defined as the size of the section of the call stack spanned by module references to the respective module. For instance, the stack footprint may be determined as the number of stack items separating the module reference with the lowest stack address from the module reference with the highest stack address, both said references pointing to the respective module. Some exemplary stack footprints are represented in FIG. 9-A-B (items 64*a-c*). In some embodiments, items comprising parameter values passed to the function currently executing are not counted in the stack footprint. In one such example, when the first and last stack references to a module are separated by 16 stack items, of which 5 items represent parameter values, the stack footprint of the respective module may be computed as 16+1−5=12.

A step 154 may then determine a ROP score for the selected module, the score indicative of a likelihood that the target process is subject to an ROP exploit. In some embodiments, the ROP score is calculated according to a density of references to the respective module within the search area. For instance, the ROP score may be computed according to the proportion of the search area occupied by gadget references, or according to the proportion of the search area occupied by no-call references, among others. An exemplary density of references may be computed according to $N_1/N_2$, wherein $N_1$ denotes a count of references to a module (for instance, gadget references to the respective module), and $N_2$ denotes a count of stack items within the search area. In some embodiments, $N_2$ is the stack footprint of the respective module.

Some embodiments determine the ROP score according to:

$$\Sigma = \alpha_1 \frac{R}{F} + \alpha_2 \frac{G}{F} + \alpha_3 \frac{S}{F}, \qquad [1]$$

wherein R denotes the count of module references to the selected module (see step 139), G denotes the count of gadget references to the selected module (see step 142), S denotes the count of no-call references to the selected module (see step 146), and F denotes the stack footprint of the selected module. Furthermore, $\alpha_1$, $\alpha_2$, and $\alpha_3$, denote pre-determined normalization constants (weights) designed to keep ROP score E within predetermined bounds, e.g., between 0 and 1, or between 0 and 100.

In one exemplary calculation, illustrated for the configuration of FIG. 8, values of quantities R, G, and S are listed in Table 1:

TABLE 1

| Module name | R | G | S |
|---|---|---|---|
| Module A | 1 | 1 | 0 |
| Module B | 2 | 2 | 1 |
| Module C | 1 | 0 | 0 |

Using constant values $\alpha_1 = 1/5$, $\alpha_2 = 2/5$, $\alpha_3 = 2/5$, and assuming the stack footprint of module B is E=10 (see step 152 above), the ROP score for module B may have an exemplary value:

$$\Sigma = \frac{1 \cdot 2 + 2 \cdot 2 + 2 \cdot 1}{5 \cdot 10} = 0.16.$$

In some embodiments, values R, G, S, and/or Σ may be further determined according to whether a particular reference is located above or below the stack pointer. For instance, references situated above the stack pointer may receive a weight different from the weight given to references situated below the stack pointer. Such treatment may address the problem of stack contamination from user-mode event interception (see, e.g. above, in relation to step 134).

In a step 156, security application 34 may compare the ROP score with a predetermined threshold, for instance 0.25, or 25 out of 100. When the score exceeds the threshold, a step 158 determines that an ROP exploit is likely, i.e., that the target thread/process is probably subject to an ROP exploit. In contrast, when the ROP score does not exceed the threshold, a step 160 determines that an ROP exploit is not likely.

FIG. 9-A illustrates an exemplary stack of a clean thread, i.e., a thread not subject to a ROP exploit according to some embodiments of the present invention. FIG. 9-A shows the structure of the stack following a user-level interception of a call to ZwCreateFile( ) Each number in square brackets represents a virtual address of a stack unit, while the number following the colon represents the respective stack item (i.e., content located at the respective virtual address). Some such items comprise module references, i.e., virtual addresses pointing within a section of virtual address space allocated to an executable module loaded by the target process. Such module references are emphasized using rectangular boxes. In the example of FIG. 9-A, the contents of each section of memory pointed to by a module reference were disassembled and shown as a corresponding sequence of code 54e-h. None of sequences 54e-h is a ROP gadget, i.e., a short sequence of instructions followed by a return instruction. FIG. 9-A further shows a stack footprint 64a of module AVCUF32.dll and a stack footprint 64b of module apphelp.dll. Items marked with (P) contain parameter values passed to the function currently in execution (in this case, ZwCreateFile); such items may be omitted when calculating stack footprint 64b.

FIG. 9-B illustrates a stack of a thread subject of a ROP exploit, the figure showing the structure of the stack following an intercept of a call to MapViewOfFile( ) Module references are represented within rectangular boxes. The contents of each section of memory pointed to by a module reference were disassembled and shown as a sequence of instructions 54j-u found within the respective section of memory. Sections 54t-u do not contain ROP gadgets. In contrast, sections 54j-s contain ROP gadgets. FIG. 9-B further shows an exemplary stack footprint 64c of module icucnv36.dll. Items marked (P) comprise parameter values; such items may be omitted from stack footprint 64c.

For the example of FIG. 9-B, an exemplary ROP score for module icucnv.dll may be computed according to Eqn. [1], wherein R=13, G=11, S=10, and F=23+1−5=19, and wherein $\alpha_1=1/5$, $\alpha_2=2/5$, $\alpha_3=2/5$, leading to a ROP score $\Sigma$ of 57.8 out of 100.

The exemplary systems and methods described above allow protecting a host system, such as a computer system, from malware. In particular, some embodiments detect an attempt by malware to employ return-oriented programming (ROP) techniques to evade detection by conventional anti-malware scanners.

In some embodiments, the execution of a target process is monitored for the occurrence of certain trigger events, which may be indicative of ROP activity, such as dynamic memory allocation, among others. When such a trigger event occurs, some embodiments analyze the call stack used by the current thread of the target process, and identify within the stack a set of references to executable modules (such as DLLs) loaded by the target process. Each such reference may be further investigated to determine whether it points to a ROP gadget, and whether the respective reference was pushed on the stack as part of the intended functionality of the target process. Some embodiments may then determine whether the target process is subject to a ROP exploit according to a ROP score calculated for the respective process and/or module. Such a ROP score may be determined according to a density of references pointing to a selected module, for instance to the proportion of the call stack occupied by such references. In some embodiments, the ROP score is calculated according to a count of references pointing to ROP gadgets, and/or according to a count of no-call references to ROP gadgets, i.e., references not pushed on the stack as part of the intended functionality of the target process.

Some conventional approaches may determine whether a reference points to a ROP gadget and/or whether the respective reference was legitimately placed on the stack, and may for instance terminate the execution when a gadget or a suspect reference is identified. However, some ROP gadgets may be falsely identified as such. For instance, some short sequences ending in a RETN instruction, therefore plausible ROP gadget candidates, may in reality be epilogues of legitimate functions. ROP detection according to simple gadget identification may therefore lead to false-positives. In contrast to such conventional approaches, some embodiments of the present invention determine whether a process is subject to a ROP exploit according to a ROP score indicative of a count of references to ROP gadgets and/or indicative of a density of such references within the call stack. Detection may be triggered when the ROP score exceeds a pre-determined threshold, which allows for a small proportion of false identifications.

Typical ROP exploits occur within a single executable module, such as a shared library, whereas sequences of code, which may be mistakenly identified as ROP gadgets may be distributed across the whole memory space of the target process. In some embodiments of the present invention, the ROP score is calculated per module, according to module-specific reference counts. For instance, some embodiments only determine the ROP score associated to the module having the highest count of references pointing to it. Such an approach may further lower the risk of a false positive ROP detection.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising at least one hardware processor configured to:
   identify a target area of a call stack used by a target process executing on the host system;
   identify a set of gadget references within the target area, each identified gadget reference pointing to a section of memory hosting a return-oriented programming (ROP) gadget; and
   in response to identifying the target area and the set of gadget references, determine whether the target process is malicious according to a proportion of the target area occupied by the set of gadget references.

2. The host system of claim 1, wherein the proportion represents a ratio between a count of the set gadget references and a size of the target area.

3. The host system of claim 1, wherein the target process is configured to load a set of libraries, and wherein identifying the target area comprises:
   identifying a set of library references, each identified library reference comprising a stack item pointing inside a library of the set of libraries, and
   identifying the target area as being a section of the call stack spanned by the set of library references.

4. The host system of claim 3, wherein the set of library references are identified so that all references of the set of library references point inside a single selected library.

5. The host system of claim 3, wherein the at least one hardware processor is configured to identify the target area further according to a count of the set of library references.

6. The host system of claim 3, wherein the at least one hardware processor is configured to determine whether the target process is malicious further according to a ratio between a count of the set of library references and a size of the target area.

7. The host system of claim 1, wherein the at least one hardware processor is further configured, in response to identifying the set of gadget references, to:

select a subset of no-call references from the set of gadget references, wherein selecting the subset of no-call references comprises:
  determining whether a reference of the set of gadget references was pushed on the stack by a call instruction of the target process, and
  in response, when the reference of the set of gadget references was not pushed on the stack by a call instruction of the target process, selecting the reference of the set of gadget references into the subset of no-call references; and
determine whether the target process is malicious further according to a ratio between a count of the subset of no-call references and a size of the target area.

8. The host system of claim 1, wherein the at least one hardware processor is configured to identify the target area in response to intercepting a call to an operating system function, and wherein identifying the target area comprises excluding from the target area any stack item comprising a parameter value being passed to the operating system function.

9. The host system of claim 1, wherein the at least one hardware processor is configured to determine whether the target process is malicious further according to whether a selected gadget reference of the set of gadget references is located above or below a stack pointer used by the target process.

10. A method comprising:
  employing at least one hardware processor of a host system to identify a target area of a call stack used by a target process executing on the host system;
  employing the at least one hardware processor to identify a set of gadget references within the target area, each identified gadget reference pointing to a section of memory hosting a return-oriented programming (ROP) gadget; and
  in response to identifying the target area and the set of gadget references, employing the at least one hardware processor to determine whether the target process is malicious according to a proportion of the target area occupied by the set of gadget references.

11. The method of claim 10, wherein the proportion represents a ratio between a count of the set gadget references and a size of the target area.

12. The method of claim 10, wherein the target process is configured to load a set of libraries, and wherein identifying the target area comprises:
  identifying a set of library references, each identified library reference comprising a stack item pointing inside a library of the set of libraries, and
  identifying the target area as being a section of the call stack spanned by the set of library references.

13. The method of claim 12, further comprising identifying the set of library references so that all references of the set of library references point inside a single selected library.

14. The method of claim 12, comprising identifying the target area further according to a count of the set of library references.

15. The method of claim 12, comprising determining whether the target process is malicious further according to a ratio between a count of the set of library references and a size of the target area.

16. The method of claim 10, further comprising, in response to identifying the set of gadget references:
  selecting a subset of no-call references from the set of gadget references, wherein selecting the subset of no-call references comprises:
    determining whether a reference of the set of gadget references was pushed on the stack by a call instruction of the target process, and
    in response, when the reference of the set of gadget references was not pushed on the stack by a call instruction of the target process, selecting the reference of the set of gadget references into the subset of no-call references; and
  determining whether the target process is malicious further according to a ratio between a count of the subset of no-call references and a size of the target area.

17. The method of claim 10, further comprising identifying the target area in response to intercepting a call to an operating system function, and wherein identifying the target area comprises excluding from the target area any stack item comprising a parameter value being passed to the operating system function.

18. The method of claim 10, further comprising determining whether the target process is malicious further according to whether a selected gadget reference of the set of gadget references is located above or below a stack pointer used by the target process.

19. A non-transitory computer-readable medium storing instructions which, when executed by at least one hardware processor of a host system, cause the host system to:
  identify a target area of a call stack used by a target process executing on the host system;
  identify a set of gadget references within the target area, each identified gadget reference pointing to a section of memory hosting a return-oriented programming (ROP) gadget; and
  in response to identifying the target area and the set of gadget references, determine whether the target process is malicious according to a proportion of the target area occupied by the set of gadget references.

* * * * *